United States Patent
Marquet et al.

(10) Patent No.: US 10,512,123 B2
(45) Date of Patent: Dec. 17, 2019

(54) MOTOR VEHICLE WIPER SYSTEM

(71) Applicant: Valeo Systèmes d'Essuyage, Le Mesnil Saint Denis (FR)

(72) Inventors: Chantal Marquet, Issoire (FR); Gérald Caillot, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/845,116

(22) Filed: Dec. 18, 2017

(65) Prior Publication Data
US 2018/0176988 A1  Jun. 21, 2018

(30) Foreign Application Priority Data
Dec. 19, 2016 (FR) ...................... 16 62782

(51) Int. Cl.
  *B60S 1/38* (2006.01)
  *H05B 1/02* (2006.01)
  *B60S 1/52* (2006.01)
  *H05B 3/00* (2006.01)

(52) U.S. Cl.
  CPC .......... *H05B 1/0225* (2013.01); *B60S 1/3805* (2013.01); *B60S 1/524* (2013.01); *B60S 1/3881* (2013.01); *B60S 1/3882* (2013.01); *H05B 3/0004* (2013.01); *H05B 2203/031* (2013.01)

(58) Field of Classification Search
  CPC ..... B60S 1/3851; B60S 1/3805; B60S 1/3881
  See application file for complete search history.

(56) References Cited

U.S. PATENT DOCUMENTS

| | | | | |
|---|---|---|---|---|
| 3,487,492 A | * | 1/1970 | Bischoff | B60S 1/482 15/250.02 |
| 3,639,938 A | * | 2/1972 | Golden | B60S 1/08 15/250.06 |
| 5,325,561 A | * | 7/1994 | Kotlar | B60S 1/3805 15/250.05 |
| 6,369,358 B1 | * | 4/2002 | Blessing | B60S 1/048 219/203 |

(Continued)

FOREIGN PATENT DOCUMENTS

EP  2821299 A1  1/2015

OTHER PUBLICATIONS

Preliminary Search Report and Written Opinion issued in corresponding French Application No. FR1662782, dated Aug. 25, 2017 (6 pages).

*Primary Examiner* — Michael D Jennings
(74) *Attorney, Agent, or Firm* — Osha Liang LLP

(57) ABSTRACT

The invention relates to a motor vehicle wiper system comprising:
  at least two windscreen wipers 12, 22, including a first windscreen wiper 12 and a second windscreen wiper 22,
  a heating device comprising a first heating element 14 designed to heat the first windscreen wiper 12 and a second heating element 24 designed to heat the second windscreen wiper 22,
  an electrical supply device designed to supply electricity to the first 14 and second 24 heating elements, and
  a control module,
the wiper system being characterized in that the control module is designed so as to delay, when the heating device is activated, the electricity supply to the second heating element 24 compared to the electricity supply to the first heating element 14, by a pause duration Δt.

16 Claims, 2 Drawing Sheets

(56) References Cited

U.S. PATENT DOCUMENTS

| | | | | |
|---|---|---|---|---|
| 7,568,256 B1* | 8/2009 | Addison | ............... | B60S 1/3805 |
| | | | | 15/250.06 |
| 2005/0086758 A1* | 4/2005 | Arkashevski | ............. | B60S 1/32 |
| | | | | 15/250.02 |
| 2010/0096377 A1* | 4/2010 | Zubrecki | ................... | B60L 1/02 |
| | | | | 219/202 |
| 2013/0192017 A1 | 8/2013 | Jacobowitz | | |
| 2013/0193129 A1* | 8/2013 | Jones | ................... | B60S 1/3881 |
| | | | | 219/202 |

\* cited by examiner

MOTOR VEHICLE WIPER SYSTEM

The invention relates to the technical field of wiper systems for motor vehicles. The invention relates in particular to the supply of electricity to heating elements that are used in such wiper systems.

Wiper systems comprising windscreen wipers are known. These windscreen wipers are each provided with a heating module or heating element, for example a heating wire. Each one of the heating elements is designed to heat one of the windscreen wipers.

Heating of the windscreen wipers advantageously makes it possible to render them less rigid, thus making it possible to improve the wiping quality. Furthermore, in the event of snow or sub-zero temperatures, heating the windscreen wiper makes it possible to melt any snow or ice that may have accumulated around the windscreen wiper. Thus, heating the windscreen wiper makes it possible to remove any hindrance to the wiper before it is made to move.

In order to supply electric energy to these heating elements, it is known to use an electric circuit comprising, in particular, an electric supply device and a protection fuse designed to protect the components of the electric circuit from excessive current intensity.

However, the heating modules are generally made of a metal material whose electrical resistivity, and therefore electrical resistance, increase with temperature. Thus, when the heating elements are first supplied with electricity, they initially have a low electrical resistivity. Consequently, the intensity of the initial current passing through them, also referred to as the inrush current, is very high. Only once the temperature of the heating elements starts to rise does their resistivity increase and the electrical intensity passing through them decrease.

Thus, when the electric circuit comprises multiple heating elements, the addition of these high initial electrical intensities can then destroy the protection fuse or cause deterioration of the electric circuit. The heating elements then become inoperative and it is no longer possible to heat the windscreen wipers.

The invention proposes in particular to overcome these drawbacks. To that end, the invention proposes a motor vehicle wiper system comprising:
- at least two windscreen wipers, including a first windscreen wiper and a second windscreen wiper,
- a heating device comprising a first heating element designed to heat the first windscreen wiper and a second heating element designed to heat the second windscreen wiper,
- an electrical supply device designed to supply electricity to the first and second heating elements, and
- a control module, the wiper system being characterized in that the control module is designed so as to delay, when the heating device is activated, the electricity supply to the second heating element compared to the electricity supply to the first heating element, by a pause duration $\Delta t$.

According to various aspects of the invention which may be taken together or separately:
- the first and second heating elements and the electrical supply device are connected electrically by a single electric circuit,
- the first heating element and/or the second heating element are made at least in part of a material whose electrical resistivity increases with its temperature,
- the control module is designed to allow electricity to be supplied to the second heating element at a time t when $I1 \leq IMAX - I2$, where IMAX corresponds to a predetermined limit value for the electrical intensity, where I1 corresponds to the electrical intensity passing through the first heating element at time t and where I2 corresponds to the electrical intensity which will pass through the second heating element when the supply of electricity to said second heating element is started,
- the electric circuit further comprises a fuse through which passes a current of intensity $IF=I1+I2$, the fuse being designed to break the electric circuit when $IF \geq IMAX$,
- the pause duration $\Delta t$ is a predetermined constant,
- the electrical supply device is designed to apply a voltage U to the electric circuit, the voltage U being defined as a function of the speed v of the motor vehicle and/or the temperature Text outside the motor vehicle,
- the control module comprises a switch which is referred to as the delay switch and is connected to a timer,
- one of the windscreen wipers, referred to as the driver wiper, is located on the front windscreen of a motor vehicle and on the driver's side, the first heating element being configured to heat the driver wiper.

The invention also relates to an activation method for a wiping device as described hereinabove, the method comprising the following steps, in this order:
- activation of the first heating element,
- pause,
- activation of the second heating element.

According to various aspects of the invention which may be taken together or separately:
- the pause step comprises a sub-step of determining, in real-time, the electrical intensity I1 passing through the first heating element,
- the pause step corresponds to a pause of predetermined duration.

The invention will be better understood, and other aims, details, features and advantages thereof will become clearer from the following detailed explanatory description of at least one embodiment of the invention, provided by way of purely illustrative and non-limiting example, with reference to the appended schematic drawings.

Figure 1:
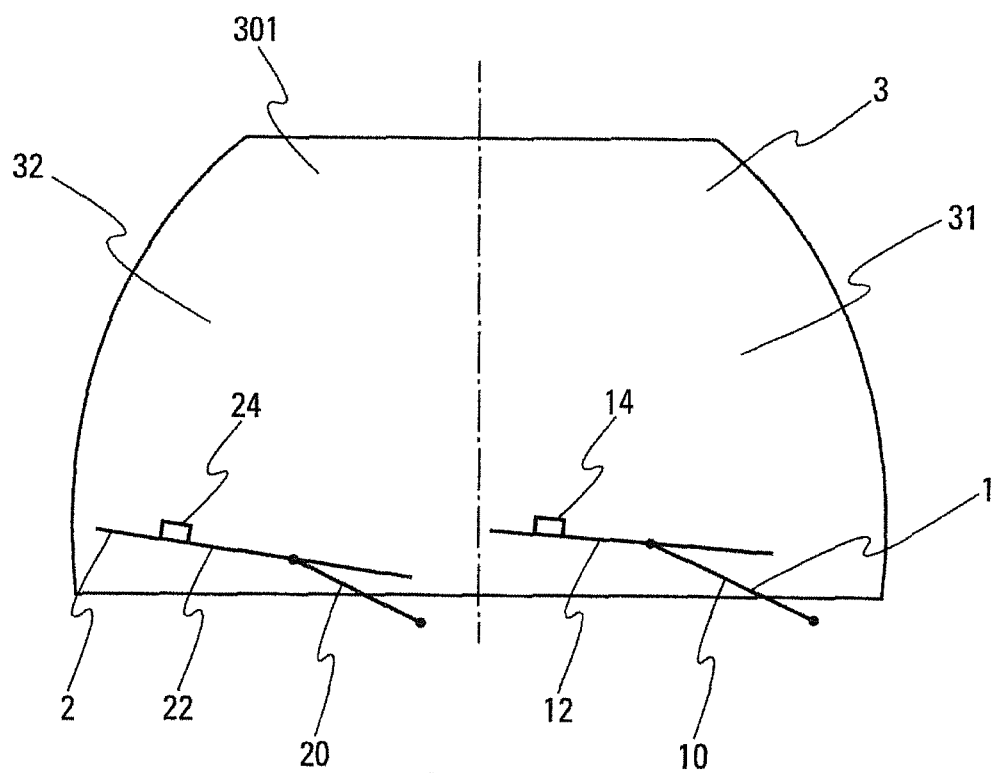
FIG. 1 is a schematic front view of the front windscreen of a motor vehicle provided with part of a wiper system in an embodiment according to the invention.

As shown in FIG. 1, in this case the wiper system comprises at least two wiping devices 1, 2, including a first wiping device 1 and a second wiping device 2. Each wiping device 1, 2 comprises, in particular, an arm 10, 20 and a windscreen wiper 12, 22 that are joined to one another. Each one of the arms 10, 20 is designed to drive in rotation the windscreen wiper 12, 22 to which it is joined.

Each one of the wiping devices 1, 2 is designed to wipe part of a pane 3 of the motor vehicle. In particular, the windscreen wipers 12, 22, when driven by their respective arms 10, 20, are designed to wipe the external surface 301 of the pane 3 of the motor vehicle.

To that end, each one of the windscreen wipers 12, 22 comprises, in particular, a wiping blade, not shown, which is designed to be in contact with the external surface 301 of the pane when the windscreen wiper 12, 22 moves over the pane 3.

In this case, the pane 3 of the motor vehicle is a front windscreen 3 of the motor vehicle. In other words, the two wiping devices 1, 2 are arranged at the front of the motor vehicle and are designed to wipe the front windscreen 3.

In a variant which is not shown, the pane 3 of the motor vehicle is for example a rear pane of the motor vehicle. In another variant which is not shown, one of the wiping devices 1, 2 is arranged at the front of the motor vehicle and is designed to wipe the front windscreen 3 while the other of the wiping devices 1, 2 is, for its part, arranged at the rear of the motor vehicle and is designed to wipe the rear pane of the motor vehicle.

The first wiping device 1 is arranged in this case on the driver's side 31 of the front windscreen 3. The second wiping device 2 is, for its part, arranged on the passenger's side 32 of the front windscreen 3. In the following, the windscreen wiper 12 of the first wiping device 1 is referred to as the first windscreen wiper 12. In the following, the windscreen wiper of the second wiping device 2 is referred to as the second windscreen wiper 22.

In other words, the first windscreen wiper 12 is designed to wipe a first half 31 of the front windscreen 3, located in front of the driver, while the second windscreen wiper 24 is, for its part, designed to wipe the other half 32 of the front windscreen 3.

The wiper system further comprises a heating device. The heating device in turn comprises a plurality of heating elements 14, 24. Here in particular, the heating device comprises at least two heating elements 14, 24, including a first heating element 14 and a second heating element 24.

In this case, we note that the heating device comprises as many heating elements 14, 24 as wiping devices 1, 2. In a variant which is not shown, it is possible to provide at least one of the wiping devices 1, 2 with a plurality of heating elements 14, 24.

Here, in particular, the first heating element 14 is arranged so as to heat the first windscreen wiper 12. The second heating element 24 is, for its part, designed to heat the second windscreen wiper 22. In a variant which is not shown, it is possible to arrange the first heating element 14 such that it heats the second windscreen wiper 22, and the second heating element 24 such that it heats the first windscreen wiper 12.

Here, the first heating element 14 is made at least in part of a material whose electrical resistivity increases with its temperature. Therefore, the electrical resistance $R_1$ of the first heating element 14 increases with its temperature. Here in particular, the first heating element 14 is made of a metallic material. More particularly still, said material is in this case copper, although other materials are conceivable.

Figure 3:
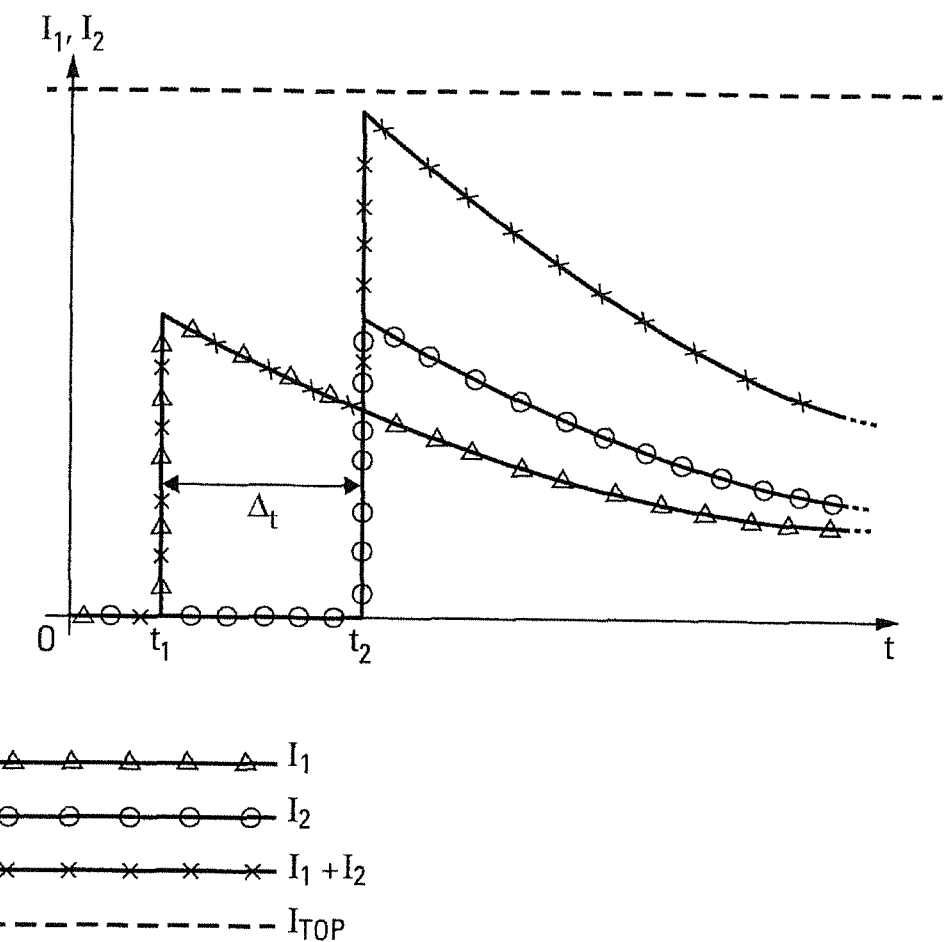
FIG. 3 is a graph showing, according to an embodiment according to the invention, the change over time in the intensity of the current passing through the first heating element, the intensity of the current passing through the second heating element, and the sum of these two intensities.

As mentioned hereinabove, the electrical resistance $R_1$ of the first heating element 14 is initially relatively low and, consequently, the intensity $I_1$ passing through the first heating element 14 is relatively high. After a few seconds, the electrical resistivity and therefore the electrical resistance $R_1$ of the first heating element 14 increases with the temperature thereof and, as shown in FIG. 3, the intensity $I_1$ passing through the first heating element 14 then decreases progressively.

The second heating element 24 is for example made of the same material as the first heating element.

Figure 2:
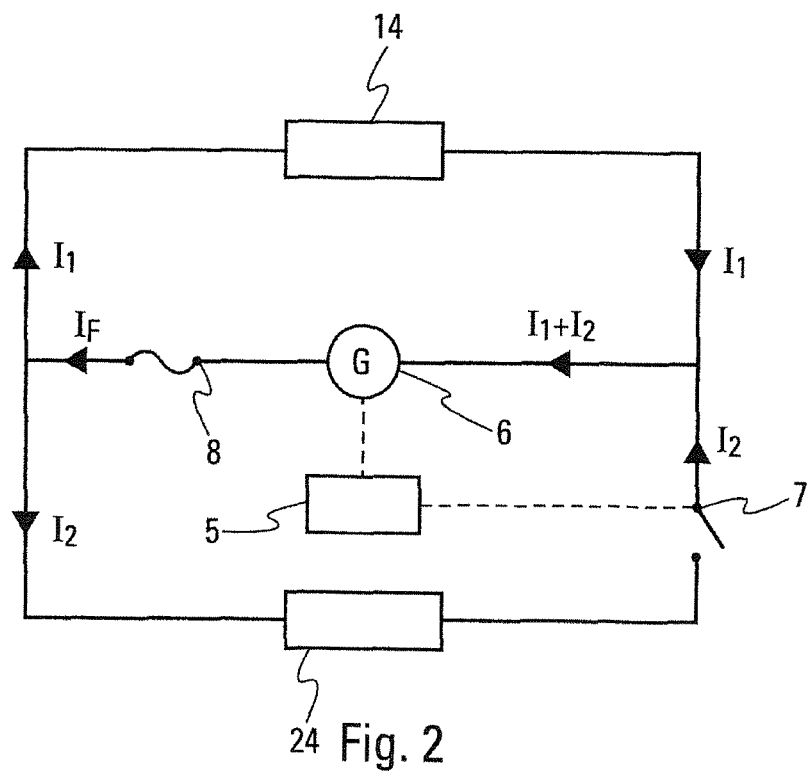
FIG. 2 is a schematic representation of an exemplary electric circuit connecting two heating elements that are designed to form part of the wiper system of FIG. 1, in an embodiment according to the invention.

As shown in FIG. 2, the wiper system further comprises a control module 5 and an electrical supply device 6.

The electrical supply device 6 is designed to supply electricity to the first 14 and second 24 heating elements. The electrical supply device 6 is for example a battery, a generator or a cell.

Upon activation of the heating device, the control module 5 is configured to temporally offset the triggering of the supply of electricity to each of the heating elements 14, 24. Hereinafter, the expression "activation of the heating element" will refer to the triggering of the supply of electricity to a heating element.

Here in particular, the control module 5 is configured to delay the activation of the second heating element 24 relative to the activation of the first heating element 14. In other words, the control module 5 is designed such that the initiation of the supply of electricity to the second heating element 24 takes place after the initiation of the supply of electricity to the first heating element 14.

Put another way, and as shown in FIG. 3, the control module 5 is configured such that, at a time $t_1$, it triggers the supply of electricity to the first heating element 14, then, at a later time $t_2$, it triggers the supply of electricity to the second heating element 24. $\Delta t$ is the duration separating $t_2$ and $t_1$. Here, $\Delta t$ is non-zero. The duration $\Delta t$ is for example between 1 s and 60 s. The duration may for example be equal or essentially equal to 30 s. This duration depends in particular on the speed with which the intensity $I_1$ passing through the first heating element 14 decreases after activation of the first heating element 14.

It is noted that the fact that the first heating element 14 is supplied first makes it possible to heat as a priority the first windscreen wiper 1 located on the driver's side 31. Thus, the quality of wiping of that part 31 of the windscreen 3 located directly in front of the driver is improved as a priority.

The activation of the heating device can be triggered manually by a user, in particular by the intermediary of the dashboard. As a variant, the heating device may also be activated automatically by the control module 5, for example when the temperature $T_{ext}$ outside the motor vehicle reaches a predetermined value, for example 0° C.

Here, as shown in FIG. 2, the first heating element 14, the second heating element 24 and the electrical supply device 6 are connected electrically by a single electric circuit.

In particular, the first heating element 14 and the second heating element 24 are connected in parallel. Thus, in the electric circuit, the electrical supply device 6 is designed to apply a voltage $U_1$ at the terminals of the first heating element 14 and a voltage $U_2$ at the terminals of the second heating element 24.

It is noted that the electrical supply device 6 is for example designed to apply an identical voltage U at the terminals of each heating element 14, 24 such that $U=U_1=U_2$.

In order to adapt the heating of the windscreen wipers 22, 12, the electrical supply device 6 may advantageously be designed to deliver a voltage U that varies depending in particular on the outside temperature $T_{ext}$ and/or the speed v at which the motor vehicle is moving. In this case, $U=U(T_{ext}, v)$. Indeed, the higher the speed v of the vehicle and the lower the outside temperature $T_{ext}$, the more heating is required by the windscreen wipers 22, 12.

In the following, $I_1$ will refer to the electrical intensity passing through the first heating element 14 when this element is supplied with electricity by the electrical supply device 6. $I_2$ will refer to the electrical intensity passing through the second heating element 24 when this element is supplied with electricity by the electrical supply device 6.

Here, the electric circuit also comprises a protection fuse 8. The protection fuse 8 experiences a current of intensity $I_F$, which corresponds to the sum of the intensities $I_1$ and $I_2$ passing respectively through the first heating element 14 and the second heating element 24. Here, the protection fuse 8 is designed to break the electric circuit when $I_F$ reaches a threshold value $I_{TOP}$.

Here, the electric circuit also comprises a switch 7, referred to as the delay switch. The delay switch 7 may adopt two positions: a closed position and an open position. Here, the delay switch 7 is arranged in that branch of the electric circuit which is connected directly to the second heating element 24.

The delay switch 7 is in particular designed so as to prevent electricity being supplied to the second heating element 24 when the switch is in the open position. Conversely, the delay switch 7 is designed so as to allow electricity to be supplied to the second heating element 24 when the switch is in the closed position. Here, the delay switch 7 is controlled by the control module 5.

Before activation of the heating device, that is to say before $t_1$, the delay switch 7 is in the open position. Thus, no electricity can be supplied to the second heating element 24. When the heating device is activated at $t_1$, the delay switch 7 is still in the open position and therefore the supply of electricity to the second heating element 24 is still prevented. Therefore, between $t_1$ and $t_2$ only the first heating element 14 is supplied with electricity.

In order to activate the supply of electricity to the second heating element 24 at $t_2$, the control module 5 switches the delay switch 7 from the open position to the closed position, which then allows electricity to be supplied to the second heating element 24.

Thus, as shown in FIG. 3, during the period $\Delta_t$ that extends between $t_1$ and $t_2$, only the first heating element is supplied with electricity. Hence, during this period, the protection fuse experiences only an intensity equal to $I_1$. Once $\Delta_t$ has elapsed, that is to say after $t_2$, both the first heating element 14 and the second heating element 24 are simultaneously supplied with electricity. As the spike in electrical intensity $I_1$ linked to the low initial resistivity of the first heating element 14 is attenuated after the period $\Delta_t$ has elapsed, the intensity $I_1$ is then low enough to allow activation of the second heating element 24 without destroying the protection fuse 8.

As will be detailed below, the control module 5 is designed to allow electricity to be supplied to the second heating element 24 only when the intensity $I_1$ is sufficiently low such that, when the second heating element 24 is switched on, the addition of the two intensities $I_1$ and $I_2$ causes no interruption in the current or damage to elements of the electric circuit.

In particular here, the control module 5 is designed to allow electricity to be supplied to the second heating element 24 only when $I_1$ is low enough that activating the second heating element 24 will not cause the protection fuse 8 to blow. In other words, the control module 5 is in this case designed to avoid the intensity $I_F$ passing through the protection fuse 8 reaching or exceeding the threshold value $I_{TOP}$ upon activation of the second heating element 24.

It will be noted that, in this case, the resistivity of the second heating element 24 remains, for its part, essentially constant as long as the second heating element 24 is not supplied with electricity. In particular, it will be noted that the resistivity of the second heating element 24, and therefore its electrical resistance $R_2$, does not depend on the temperature of the first heating element 14.

Put another way, the control module 5 is designed to allow electricity to be supplied to the second heating element 24 only when the electrical resistance $R_1$ of the first heating element 14 is high enough for the following equation to hold immediately after activation of the second heating element 24: $I_1(t_2)+I_2(t_2) \leq I_{TOP}$ where $I_1(t_2)$ corresponds to the value of $I_1$ at $t_2$ and $I_2(t_2)$ corresponds to the value of $I_2$ at $t_2$.

In other words, the control module is in this case configured to allow electricity to be supplied to the second heating element only from the point $t_2$ at which the electrical intensity $I_1(t_2)$ passing through the first heating element is lower than $I_{TOP}-(U_2/R_2)$.

As a variant, in order to keep a margin of error, the control module 5 might be configured such that, upon activation of the second heating element 24, the following equation holds: $I_1+I_2 \leq I_{MAX}$, where $I_{MAX}$ is a threshold value at least slightly lower than $I_{TOP}$. For example, one might choose $I_{MAX}=0.91*I_{TOP}$. Alternatively, one might choose $I_{MAX}=I_{TOP}$.

According to a first embodiment, the control module 5 is configured to measure, for example in real-time, the electrical intensity $I_1$ passing through the first heating element 14. As a variant, the intensity $I_1$ can be calculated from a measurement of the resistance $R_1$.

According to a second embodiment, the control module 5 is configured to make the activation of the first 14 and second 24 heating elements differ by a predetermined duration $\Delta_{tfixe}$. In this embodiment, it is therefore not necessary to measure the intensity $I_1$, or even to measure the electrical resistance $R_1$. Here, one chooses a sufficiently large predetermined duration $\Delta_{tfixe}$ to ensure that the intensity $I_1$ has the time to drop sufficiently over $\Delta_{tfixe}$ such that, upon activation of the second heating element 24, the sum of $I_1$ and $I_2$ is less than $I_{MAX}$. Here, in particular, the control module is designed to close the delay switch 7 once the predetermined duration $\Delta_{tfixe}$ has elapsed. To that end, the control module 5 comprises, for example, a timer.

In this second embodiment, in order to be able to take into account the external conditions, the control module may be configured to define the predetermined duration $\Delta_{tfixe}$, in particular at the moment of activating the first heating element 14, that is to say at $t_1$, as a function of the temperature $T_{ext}$ and/or the speed v at which the vehicle is moving, and/or as a function of the voltage $U_1$ applied to the terminals of the first heating element 14. In this case, $\Delta_{tfixe}=\Delta_{tfixe}(T_{ext}, v, U_1)$.

In a variant which is not shown, the wiper system comprises n wiping devices, each of which is equipped with at least one heating element, n being equal to 3 and 4. In this variant, the activations of each heating element are allowed by the control module 5, the activation of at least one of the heating elements being delayed with respect to at least one of the other heating elements.

The invention also relates to an activation method for a wiper system as described hereinabove.

The method comprises the following successive steps, in this order:

activation of the first heating element 14, a pause step, activation of the second heating element 24.

According to a first embodiment, the intermediate step advantageously comprises a sub-step of measuring the electrical intensity $I_1$ passing through the first heating element 14.

According to a second embodiment, the intermediate step corresponds to a pause step of predetermined duration $\Delta_{tfixe}$.

Here, advantageously, the intermediate step does not comprise a measurement sub-step.

The invention claimed is:

1. A motor vehicle wiper system, comprising:
   at least two windscreen wipers, including a first windscreen wiper and a second windscreen wiper;
   a heating device comprising a first heating element for heating the first windscreen wiper and a second heating element for heating the second windscreen wiper;
   an electrical supply device for supplying electricity to the first and second heating elements; and
   a control module configured to delay, when the heating device is activated, the electricity supply to the second heating element compared to the electricity supply to the first heating element, by a pause duration $\Delta t$;
   a single electrical circuit configured to electrically connect the first heating element, second heating element, and the electrical supply device.

2. The wiper system according to claim 1 wherein the first heating element and the second heating element are made at least in part of a material whose electrical resistivity increases with its temperature.

3. The wiper system according to claim 2, wherein the control module allows electricity to be supplied to the second heating element at a time t when $I_1 < I_{MAX} - I_2$, where $I_{MAX}$ corresponds to a predetermined limit value for the electrical intensity, where $I_1$ corresponds to the electrical intensity passing through the first heating element at time t and where $I_2$ corresponds to the electrical intensity which will pass through the second heating element when the supply of electricity to said second heating element is started.

4. The wiper system according to claim 3, wherein the electric circuit further comprises a fuse through which passes a current of intensity $I_F = I_1 + I_2$, the fuse being designed to break the electric circuit when $I_F > I_{MAX}$.

5. The wiper system according to claim 1, wherein the pause duration is a predetermined constant.

6. The wiper system according to claim 2, wherein the electrical supply device is designed to apply a voltage to the electric circuit, the voltage being defined as a function of at least one selected from the group consisting of the speed of the motor vehicle or the temperature outside the motor vehicle.

7. The wiper system according to claim 1, wherein the control module comprises a delay switch connected to a timer.

8. The wiper system according to claim 1, wherein one of the windscreen wipers, a driver wiper, is located on the front windscreen of a motor vehicle and on the driver's side, the first heating element being configured to heat the driver wiper.

9. A motor vehicle wiper system, comprising:
   at least two windscreen wipers, including a first windscreen wiper and a second windscreen wiper;
   a heating device comprising a first heating element for heating the first windscreen wiper and a second heating element for heating the second windscreen wiper;
   an electrical supply device for supplying electricity to the first and second heating elements; and
   a control module, comprising a delay switch connected to a timer, configured to delay, when the heating device is activated, the electricity supply to the second heating element compared to the electricity supply to the first heating element, by a pause duration $\Delta t$.

10. The wiper system according to claim 9, wherein the first and second heating elements and the electrical supply device are connected electrically by a single electric circuit.

11. The wiper system according to claim 10, wherein the first heating element and the second heating element are made at least in part of a material whose electrical resistivity increases with its temperature.

12. The wiper system according to claim 11, wherein the control module allows electricity to be supplied to the second heating element at a time t when $I_1 < I_{MAX} - I_2$, where $I_{MAX}$ corresponds to a predetermined limit value for the electrical intensity, where $I_1$ corresponds to the electrical intensity passing through the first heating element at time t and where $I_2$ corresponds to the electrical intensity which will pass through the second heating element when the supply of electricity to said second heating element is started.

13. The wiper system according to claim 12, wherein the electric circuit further comprises a fuse through which passes a current of intensity $I_F = I_1 + I_2$, the fuse being designed to break the electric circuit when $I_F > I_{MAX}$.

14. The wiper system according to claim 9, wherein the pause duration is a predetermined constant.

15. The wiper system according to claim 11, wherein the electrical supply device is designed to apply a voltage to the electric circuit, the voltage being defined as a function of at least one selected from the group consisting of the speed of the motor vehicle or the temperature outside the motor vehicle.

16. The wiper system according to claim 9, wherein one of the windscreen wipers, a driver wiper, is located on the front windscreen of a motor vehicle and on the driver's side, the first heating element being configured to heat the driver wiper.

* * * * *

UNITED STATES PATENT AND TRADEMARK OFFICE
CERTIFICATE OF CORRECTION

PATENT NO. : 10,512,123 B2
APPLICATION NO. : 15/845116
DATED : December 17, 2019
INVENTOR(S) : Chantal Marquet et al.

It is certified that error appears in the above-identified patent and that said Letters Patent is hereby corrected as shown below:

In the Claims

At Column 7, Claim number 3, Line number 26, the equation "$I_1 < I_{MAX} - I_2$" should read -- $I_1 \leq I_{MAX} - I_2$ --.

At Column 7, Claim number 4, Line number 37, the equation "$I_F > I_{MAX}$" should read -- $I_F \geq I_{MAX}$ --.

At Column 8, Claim number 12, Line number 25, the equation "$I_1 < I_{MAX} - I_2$" should read -- $I_1 \leq I_{MAX} - I_2$ --.

At Column 8, Claim number 13, Line number 36, the equation "$I_F > I_{MAX}$" should read -- $I_F \geq I_{MAX}$ --.

Signed and Sealed this
Seventeenth Day of March, 2020

Andrei Iancu
*Director of the United States Patent and Trademark Office*